(12) United States Patent
Pang

(10) Patent No.: US 10,363,702 B2
(45) Date of Patent: Jul. 30, 2019

(54) THREE DIMENSIONAL PRINTING APPARATUS

(71) Applicants: XYZprinting, Inc., New Taipei (TW); Kinpo Electronics, Inc., New Taipei (TW)

(72) Inventor: Bo Pang, New Taipei (TW)

(73) Assignees: XYZprinting, Inc., New Taipei (TW); Kinpo Electronics, Inc., New Taipei (TW)

(*) Notice: Subject to any disclaimer, the term of this patent is extended or adjusted under 35 U.S.C. 154(b) by 146 days.

(21) Appl. No.: 15/437,460

(22) Filed: Feb. 21, 2017

(65) Prior Publication Data

US 2018/0236721 A1  Aug. 23, 2018

(51) Int. Cl.
   *B29C 64/124* (2017.01)
   *B29C 64/106* (2017.01)
   *B29C 64/135* (2017.01)
   *B29C 64/214* (2017.01)
   *B29C 64/321* (2017.01)
   *B29C 64/236* (2017.01)
   *B33Y 30/00* (2015.01)
   *B33Y 10/00* (2015.01)

(52) U.S. Cl.
   CPC .......... *B29C 64/124* (2017.08); *B29C 64/106* (2017.08); *B29C 64/135* (2017.08); *B29C 64/214* (2017.08); *B29C 64/236* (2017.08); *B29C 64/321* (2017.08); *B33Y 10/00* (2014.12); *B33Y 30/00* (2014.12)

(58) Field of Classification Search
   CPC ............................ B29C 64/106; B29C 64/124
   See application file for complete search history.

(56) References Cited

U.S. PATENT DOCUMENTS

| 6,656,410 | B2* | 12/2003 | Hull | B29C 41/12 264/113 |
|---|---|---|---|---|
| 7,556,490 | B2* | 7/2009 | Wicker | B29C 64/135 264/113 |
| 8,894,400 | B2* | 11/2014 | Costabeber | B29C 64/124 425/174.4 |
| 2008/0113293 | A1* | 5/2008 | Shkolnik | B29C 64/106 264/401 |
| 2013/0234369 | A1* | 9/2013 | Schwarzler | B29C 64/165 264/401 |

* cited by examiner

*Primary Examiner* — Timothy Kennedy
(74) *Attorney, Agent, or Firm* — JCIPRNET

(57) ABSTRACT

A three dimensional printing apparatus including a tank, an injecting module, a leveling module, a curing module, and a control module is provided. The injecting module is disposed at the tank to inject a liquid forming material into the tank. The leveling module is movably disposed in the tank. The curing module is disposed above the tank. The control module is electrically connected to the injecting module, the leveling module, and the curing module. The leveling module is controlled by the control module to be moved in the tank, so as to level a surface of the liquid forming material. The curing module is controlled by the control module to cure the leveled liquid forming material to form a solidification layer.

9 Claims, 4 Drawing Sheets

THREE DIMENSIONAL PRINTING APPARATUS

BACKGROUND

Field

The disclosure relates to a three dimensional printing apparatus.

Description of Related Art

With the continuous development of science and technology, various methods using the additive manufacturing technology to construct three-dimensional (3-D) models have been proposed. Generally speaking, the additive manufacturing technology converts design data of three-dimensional models constructed with computer-aided design software, for example, into a plurality of thin (pseudo-two-dimensional) cross-sectional layers that are continuously stacked.

Currently, several ways to form the thin cross-sectional layers have been developed. However, with the increase of viscosity of the liquid forming material, the smoothness of the cross-sectional layer will be affected due to its flowability. That is, a sufficient flatness can not be maintained due to being limited by material characteristics of the forming material, thereby resulting in the cross-sectional layer after curing or even a three dimensional object formed after stacking does not meet the needs.

SUMMARY

The disclosure provides a three dimensional printing apparatus, which improves quality of a solidification layer by a leveling module.

The disclosure provides a three dimensional printing apparatus including a tank, an injecting module, a leveling module, a curing module, and a control module. The injecting module is disposed at the tank to inject a liquid forming material into the tank. The leveling module is movably disposed in the tank. The curing module is disposed above the tank. The control module is electrically connected to the injecting module, the leveling module, and the curing module. The leveling module is controlled by the control module to be moved in the tank, so as to level a surface of the liquid forming material. The curing module is controlled by the control module to cure the leveled liquid forming material to form a solidification layer.

Based on the above, the three dimensional printing apparatus can provide a leveling action for the liquid forming material injected into the tank through the leveling module, without being limited by material characteristics of the liquid forming material, so as to effectively improve the performance of three dimensional printing. That is, after the liquid forming material is injected into the tank, the leveling module can be activated to level the surface of the liquid forming material. Thus, when the viscosity of the liquid forming material is higher, such step can save the waiting time before the liquid forming material is cured. Also, since the leveled liquid forming material has a better flatness after curing, the subsequently stacked three dimensional object has better structure and strength.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
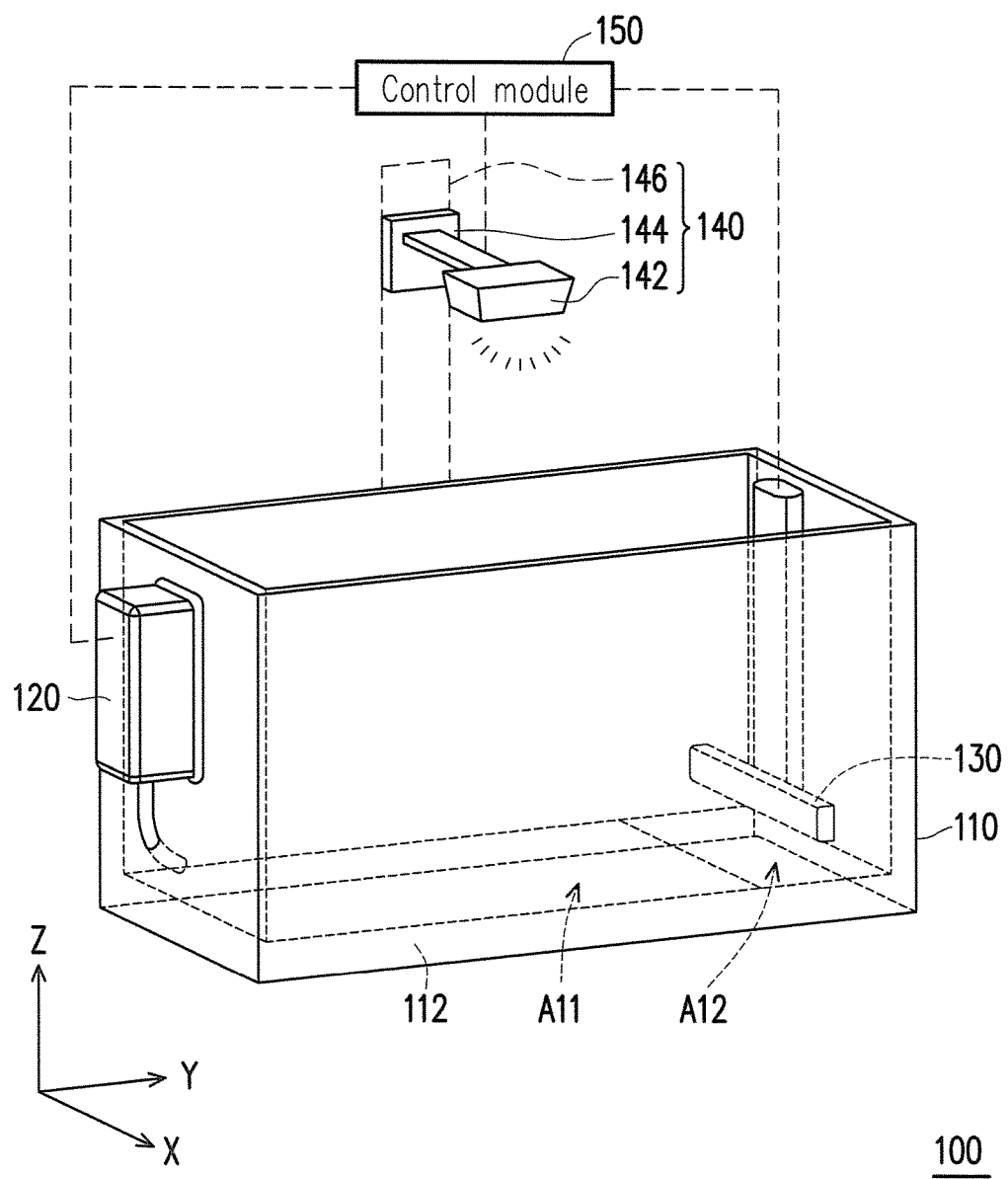
FIG. 1 is a schematic view of a three dimensional printing apparatus according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic view of a three dimensional printing apparatus according to an embodiment of the disclosure. An orthogonal coordinate system X-Y-Z is provided herein for the convenience of the following description. Referring to FIG. 1, in the embodiment, a three dimensional printing apparatus 100 includes a tank 110, an injecting module 120, a leveling module 130, a curing module 140, and a control module 150. The injecting module 120 is disposed next to the tank 110 to inject a liquid forming material (not shown) into the tank 110. The operation of the injecting module 120 is not limited herein. For example, the injecting module 120 can achieve the purpose of injecting the liquid forming material into the tank 110 by a storage container and a pump.

The leveling module 130 is movably disposed in the tank 110. The curing module 140 is disposed above the tank 110. The control module 150 is electrically connected to the injecting module 120, the leveling module 130, and the curing module 140. The injecting module 120 is controlled by the control module 150 to inject the liquid forming material into a forming zone A11 at an inner bottom 112 of the tank 110. The leveling module 130 is controlled by the control module 150 to be moved in the tank 110, so as to level a surface of the liquid forming material, and then the curing module 140 is controlled by the control module 150 to cure the leveled liquid forming material to form a solidification layer.

Figure 2:
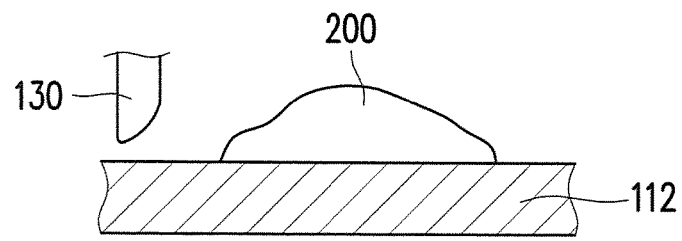
FIG. 2 is a partial enlarged view of the three dimensional printing apparatus of FIG. 1.
Figure 3:
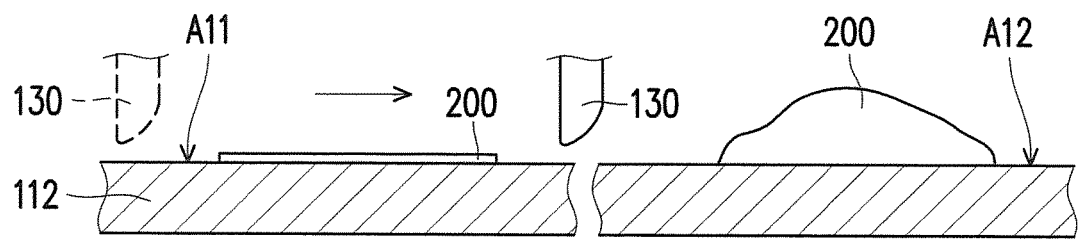
FIG. 3 is a schematic view illustrating the leveled liquid forming material of FIG. 2.

FIG. 2 is a partial enlarged view of the three dimensional printing apparatus of FIG. 1. FIG. 3 is a schematic view illustrating the leveled liquid forming material of FIG. 2. The position of the leveling module 130 at a previous time point is depicted in dashed lines, and FIG. 2 and FIG. 3 are partially sectional views of FIG. 1 taken along the Y-Z plane. Referring to FIG. 1 to FIG. 3 at the same time, specifically, in the embodiment, a liquid forming material 200 is a photosensitive resin, for example, or a mixture of a polymer and a ceramic powder (or metal powder). The material characteristics is that a viscosity thereof is larger than or equal to 1000 centipoises (cP). Thus, as shown in FIG. 2 and FIG. 3, when the injecting module 120 injects the liquid forming material 200 into the tank 110, since the material has a higher viscosity (i.e., the liquid forming material 200 has a higher cohesive force), the liquid forming material 200 requires a longer waiting time to be gradually filled in the forming zone A11 at the inner bottom 112 of the tank 110. Therefore, the processing time required for the three dimensional printing apparatus 100 is prolonged, which is not conducive to the manufacturing performance thereof.

Accordingly, the three dimensional printing apparatus 100 of the embodiment is provided with the leveling module 130 having a scraper device (as shown in FIG. 2 and FIG. 3) with a unilateral inclined profile, such that after the injecting module 120 injects the liquid forming material 200, the control module 150 drives the scraper device of the leveling module 130 to level the surface of the liquid forming material 200. Thereafter, the control module 150 drives the curing module 140 to cure the leveled liquid forming material 200, such that the liquid forming material 200 forms a solidification layer. Thus, the processing time can be effectively saved. In another embodiment not shown, the scraper device may also have a bilateral inclined profile. Additionally, in yet another embodiment not shown, the leveling module may also use a roller (or a roller with the aforementioned scraper device simultaneously) for leveling the liquid forming material.

It should be noted that the injecting module 120 and the leveling module 130 shown in FIG. 1 are for illustration only, which can be substantially driven by the control module 150 to be moved in a space shown in the orthogonal coordinate system X-Y-Z.

Furthermore, referring to FIG. 1 and FIG. 3, in the embodiment, the inner bottom 12 of the tank 110 further has a recycle zone A12 adjacent to the forming zone A11, such that after the liquid forming material 200 is leveled by the leveling module 130, the excess liquid forming material 200 can be stored in the recycle zone A12, which is conducive to the next leveling or recycling.

Additionally, after a previous solidification layer is completed, the control module 150 can control the injecting module 120, the leveling module 130, and the curing module 140 to prepare the next solidification layer on the basis of the previous solidification layer. Such the process steps of injecting, leveling and curing are repeated, a plurality of solidification layers can be gradually stacked to form a three dimensional object, so as to complete the three dimensional printing.

Figure 4:
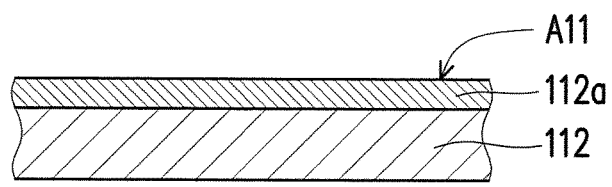
FIG. 4 is a partial enlarged view illustrating a three dimensional printing apparatus according to another embodiment of the disclosure.

FIG. 4 is a partial enlarged view illustrating a three dimensional printing apparatus according to another embodiment of the disclosure. The difference between the aforementioned embodiment and the embodiment is that the tank of the embodiment further includes a removable carrier 112a, and the carrier 112a has the forming zone A11. That is, the tank of the embodiment is a separable component substantially, such that after the carrier 112a is configured at the inner bottom 112, the aforementioned three dimensional printing process of injecting, leveling, and curing are performed. After the three dimensional object is completed, the user can only remove the carrier 112a from the tank to obtain the required three dimensional object without disassembling the whole tank, which will help to improve the production of the three dimensional printing apparatus.

Figure 5:
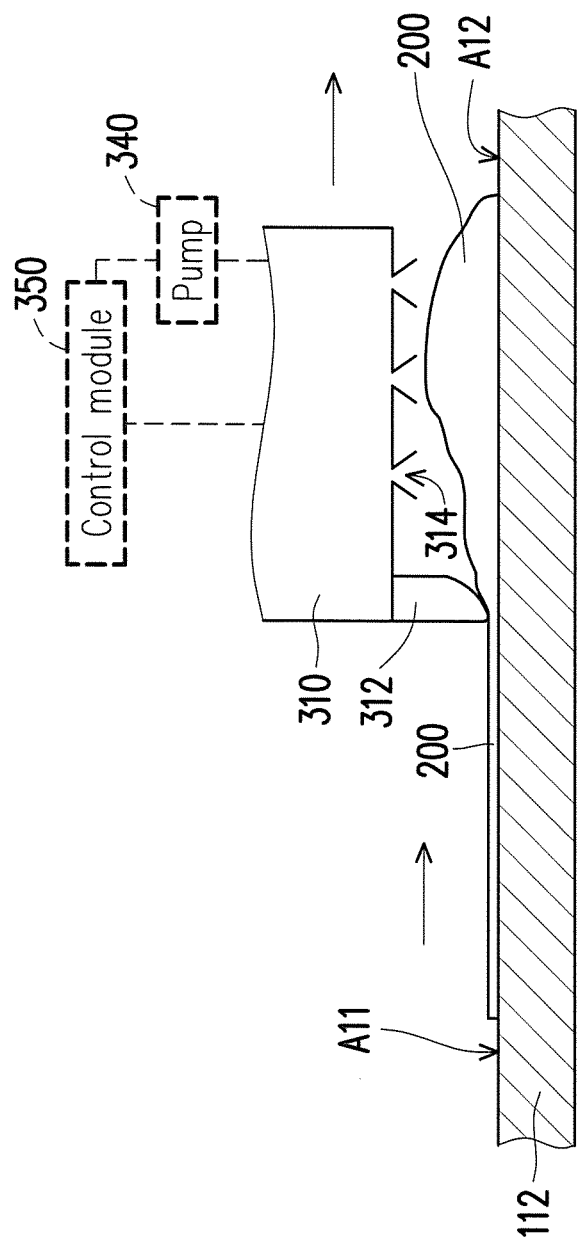
FIG. 5 is a partial enlarged view illustrating a three dimensional printing apparatus according to yet another embodiment of the disclosure.

FIG. 5 is a partial enlarged view illustrating a three dimensional printing apparatus according to yet another embodiment of the disclosure. In the embodiment, an injecting module 310 and a leveling module 312 are an integrated structure and are driven by a control module 350. As shown in FIG. 5, the injecting module 310 can be loaded with the liquid forming material 200 driven by a pump 340 to be injected into the inner bottom 112 of the tank through a spray nozzle 314. While the liquid forming material 200 is injected, the leveling module 312 also provides the action of leveling the surface of the liquid forming material 200 with the movement of the structure simultaneously, thereby improving the efficiency of the process steps of injecting and leveling.

On the other hand, referring to FIG. 1, the curing module 140 of the embodiment includes a light source 142 and a moving assembly, including a moving portion 144 and a rail 146 as depicted in FIG. 1, and the light source 142 is disposed on the moving portion 144. The control module 150 is electrically connected to the light source 142 and the moving portion 144 respectively, and is in accordance with the position of the leveled liquid forming material 200 in the tank 110 to drive the light source 142 through the moving assembly along Z-axis, so as to adjust a distance(height) of the light source 142 relative to the leveled liquid forming material 200 in the forming zone A11, such that light generated by the light source 142 with a sufficient and larger illuminance can be irradiated on the liquid forming material 200 to be cured.

Figure 6:
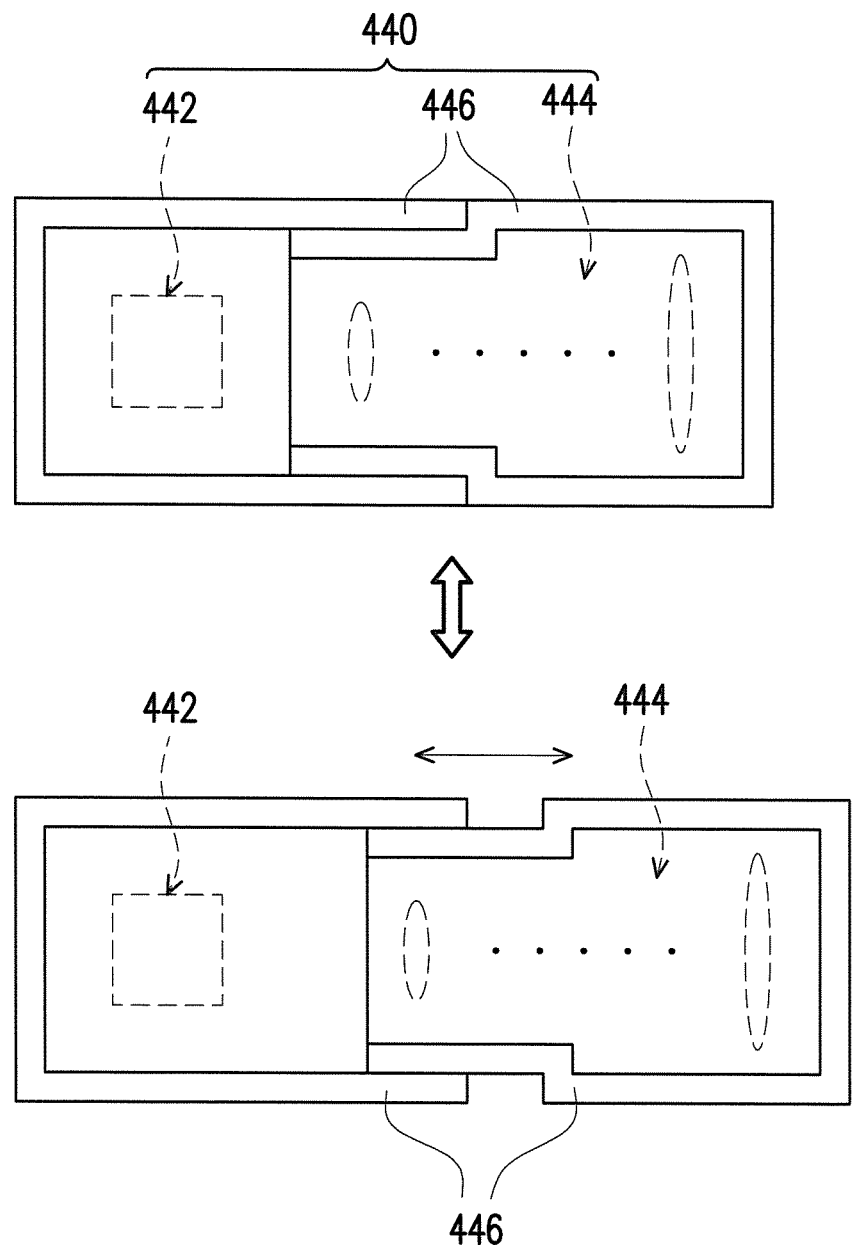
FIG. 6 is a side view illustrating a curing module according to another embodiment of the disclosure.

FIG. 6 is a side view illustrating a curing module according to another embodiment of the disclosure. Referring to FIG. 6, a curing module 440 includes a light source 442 and a focusing assembly fixed above the tank 110 as depicted in FIG. 1, wherein the focusing assembly includes an adjusting portion 446 and a lens set 444 (some lens are omitted), and the light source 442 and the lens set 444 are disposed in the adjusting portion 446, such that a path of the light generated by the light source 442 can be adjusted via the structural motion of the adjusting portion 446. After the curing module 440 being fixed above the tank 110, the control module 150 is in accordance with a position of the leveled liquid forming material 200 in the tank 110 to drive the light source 442 and the focusing assembly, so as to focus on the leveled liquid forming material 200 in the forming zone A11.

In summary, in the embodiment of the disclosure, the three dimensional printing apparatus can provide a leveling action for the liquid forming material injected into the tank through the leveling module, without being limited by material characteristics of the liquid forming material, so as to effectively improve the performance of three dimensional printing. That is, after the liquid forming material is injected into the tank, the leveling module can be activated to level the surface of the liquid forming material. Thus, when the viscosity of the liquid forming material is higher, such step can save the waiting time before the liquid forming material is cured. Also, since the leveled liquid forming material has a better flatness after curing, the subsequently stacked three dimensional object has better structure and strength.

Furthermore, as the tank is formed as a separable component, such that the carrier can be separated from the inner bottom of the tank, which is conducive to the production of the three dimensional printing process. Additionally, the leveling module and the injecting module are integrally structured. Not only the action of the control module to drive the both respectively can be saved, but the efficiency of leveling can be further improved.

Although the disclosure has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A three dimensional printing apparatus, comprising:
a tank;
an injecting module, disposed at the tank to inject a liquid forming material into the tank;
a leveling module, movably disposed in the tank;
a curing module, disposed above the tank; and
a control module, electrically connected to the injecting module, the leveling module, and the curing module, wherein the leveling module is controlled by the control module to be moved in the tank, so as to level a surface of the liquid forming material in the tank, and the curing module is controlled by the control module to cure the leveled liquid forming material to form a solidification layer on an inner bottom of the tank,
wherein the surface of the liquid forming material gradually rises relative to the inner bottom of the tank.

2. The three dimensional printing apparatus according to claim 1, wherein a viscosity of the liquid forming material is larger than or equal to 1000 centipoises (cP).

3. The three dimensional printing apparatus according to claim 1, wherein the tank has a forming zone, and the injecting module is controlled by the control module to inject the liquid forming material into the forming zone.

4. The three dimensional printing apparatus according to claim 3, wherein the tank further has a recycle zone adjacent to the forming zone, after the pg,13 leveling module levels the liquid forming material located at the forming zone, an excess liquid forming material is driven to the recycle zone by the leveling module.

5. The three dimensional printing apparatus according to claim 1, wherein the leveling module has a scraper device.

6. The three dimensional printing apparatus according to claim 1, wherein the curing module comprises a light source and a focusing assembly fixed above the tank, and the control module drives the light source and the focusing assembly to generate a light focusing on the leveled liquid forming material in accordance with a position of the leveled liquid forming material in the tank.

7. The three dimensional printing apparatus according to claim 1, wherein the curing module comprises a light source and a moving assembly, and the control module drives the light source through the moving assembly to adjust a distance of the light source relative to the leveled liquid forming material in accordance with a position of the leveled liquid forming material in the tank.

8. The three dimensional printing apparatus according to claim 1, wherein the injecting module and the leveling module are an integrated structure.

9. The three dimensional printing apparatus according to claim 1, wherein the inner bottom of the tank further comprising a removable carrier.

* * * * *